(12) United States Patent
Goldmann et al.

(10) Patent No.: US 11,550,610 B2
(45) Date of Patent: Jan. 10, 2023

(54) VEHICLE SYSTEM, VEHICLE AND METHOD FOR OPERATING SUCH A VEHICLE SYSTEM

(71) Applicant: Continental Automotive GmbH, Hannover (DE)

(72) Inventors: Andreas Goldmann, Neunkirchen (DE); Steffen Ehrhardt, Schöffengrund (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 358 days.

(21) Appl. No.: 16/811,630

(22) Filed: Mar. 6, 2020

(65) Prior Publication Data
US 2020/0293357 A1    Sep. 17, 2020

(30) Foreign Application Priority Data

Mar. 13, 2019    (DE) ...................... 10 2019 203 377.6

(51) Int. Cl.
*G06F 9/455*    (2018.01)
*B60R 16/03*    (2006.01)
(Continued)

(52) U.S. Cl.
CPC .......... *G06F 9/45558* (2013.01); *B60R 16/03* (2013.01); *G06F 9/5077* (2013.01);
(Continued)

(58) Field of Classification Search
CPC ............... G06F 9/45558; G06F 9/5077; G06F 2009/4557; G06F 2009/45575
See application file for complete search history.

(56) References Cited

U.S. PATENT DOCUMENTS

| 6,249,739 B1 * | 6/2001 | Noehring ................ G06F 1/305 |
| | | 714/E11.138 |
| 9,940,159 B1 | 4/2018 | Ovchinnikov et al. |

(Continued)

FOREIGN PATENT DOCUMENTS

| DE | 102012205301 | 10/2013 |
| DE | 102014215410 | 2/2015 |

(Continued)

OTHER PUBLICATIONS

Shravan Karthick; Hypervisor based approach for integrated cockpit solutions; 2018; (Year: 2018).*

(Continued)

*Primary Examiner* — Dong U Kim
(74) *Attorney, Agent, or Firm* — Cozen O'Connor

(57) ABSTRACT

A vehicle system having: a hardware level, a first operating system, and a virtual machine integrated on the hardware level having a second operating system. A hypervisor operates the virtual machine such that the first and the second operating systems) are operated in parallel on the hardware. A first application is executed on the first operating system and a second application is executed on the second operating system. The first application has a higher safety standard than the second application. The second operating system is configured to be operated in suspend-to-RAM mode while the first operating system is switched off.

21 Claims, 5 Drawing Sheets

(51) Int. Cl.
*G06F 9/50* (2006.01)
*G06F 13/10* (2006.01)

(52) U.S. Cl.
CPC .... *G06F 13/107* (2013.01); *G06F 2009/4557* (2013.01); *G06F 2009/45575* (2013.01); *G06F 2213/0038* (2013.01)

(56) References Cited

U.S. PATENT DOCUMENTS

| | | | |
|---|---|---|---|
| 2010/0218183 | A1 | 8/2010 | Wang et al. |
| 2015/0143362 | A1* | 5/2015 | Lukacs ................ G06F 9/4843 718/1 |
| 2018/0225140 | A1 | 8/2018 | Titus et al. |
| 2020/0192722 | A1* | 6/2020 | Lenz .................... G06F 9/5077 |
| 2020/0371847 | A1* | 11/2020 | Claraz .................. G06F 9/4881 |

FOREIGN PATENT DOCUMENTS

| | | |
|---|---|---|
| DE | 102014224485 | 6/2016 |
| DE | 112016001377 | 12/2017 |
| JP | 2003-508674 | 3/2003 |
| JP | 2014-531099 | 11/2014 |
| JP | 2017-507401 | 3/2017 |
| KR | 101780052 B1 | 9/2017 |

OTHER PUBLICATIONS

Office Action for the corresponding German Patent Application No. 10 2019 203 377.6.
The Linux Foundation, "The Automotive Grade Linux Software Defined Connected Car Architecture", Jun. 20, 2008.
Green Hills Software "Secure Virtualization".
"QNX Hypervisor" Home (https://blackberry.qnx.com/en) > Products (https://blackberry.qnx.com/en/products/neutrino-rtos/index.html) > Hypervisor (https://blackberry.qnx.com/en/products/hypervisor/index.html).
Shravan et al., "Hypervisor Based Approach for Integrated Cockpit Solutions," 2018 IEEE 8$^{th}$ Conference on Consumer Electronics—Berlin, Sep. 2, 2018, 6 pages.
Notice of Allowance dated Nov. 4, 2021 issued in Korean Patent Application No. 10-2020-0031014.
Office Action dated Jun. 1, 2021 issued in Korean Patent Application No. 10-2020-0031014.

* cited by examiner

VEHICLE SYSTEM, VEHICLE AND METHOD FOR OPERATING SUCH A VEHICLE SYSTEM

BACKGROUND OF INVENTION

1. Field of the Invention

The invention relates to a vehicle system comprising a hardware level, a first operating system, a virtual machine having a second operating system, wherein the virtual machine is integrated on the hardware level, and a hypervisor that is designed to operate the virtual machine on the hardware level such that the first operating system and the second operating system are able to be operated in parallel on the hardware level. The invention furthermore relates to a vehicle, to a method for operating such a vehicle system, and to a computer program.

2. Description of Related Art

Many vehicles contain vehicle systems that allow them to operate a multiplicity of different applications, such as an infotainment system function, an audio function, or a navigation function. To control the vehicle systems, a CPU operates with a standard operating system, such as for example a Linux operating system.

When the vehicle system is booted, the CPU requires a relatively long time to boot the Linux operating system. A user therefore has to wait for a long time before a desired instrument finishes its preparatory processing after starting the vehicle and before the vehicle system is ready for use. This prevents a user for example from immediately being able to use a function of a reverse camera or another important application in the vehicle. A faster boot procedure is able to be achieved by putting the entire vehicle system into suspend-to-RAM mode. This however does not ensure safe operation.

DE 102014215410 A1 discloses a vehicle system of a vehicle, the vehicle system comprising: an on-board computer system having a first processor and a second processor, wherein the first processor executes an operating system and the second processor is connected to a vehicle control system; a computer-readable memory that stores instructions that are able to be executed by the first processor in order: to operate the on-board computer system in a suspend mode with a volatile memory in standby while the vehicle is switched off; to establish whether a reboot is able to be completed before a selected event; and to reboot the on-board computer system if it is established that a reboot is able to be completed before the selected event.

DE 112016001377 T5 discloses a vehicle on-board system having a primary CPU that is installed in a vehicle and operates with a general-purpose operating system; and a peripheral device controlled by the primary CPU, wherein the vehicle on-board system furthermore has: a secondary CPU that operates with a real-time operating system, wherein the secondary CPU, when put into operation, performs initialization processing on the peripheral device and then allocates control of the peripheral device to the primary CPU.

DE 102014224485 A1 discloses an on-board power system for a vehicle comprising a current source and at least one sampling control apparatus that is configured so as to sample state signals of at least one further control apparatus and/or at least one switching unit in a manner clocked at a predefined cycle time, wherein the on-board power system is configured such that it is able to be switched from a first operating state, what is called the normal operating state, to a second operating state, what is called the standby operating state, in which it consumes less energy than in the normal operating state, and is furthermore configured, in the normal operating state, so as to record state signals at a shorter cycle time than in the standby operating state, wherein the sampling control apparatus is configured such that the cycle time is changed automatically from a first standby cycle time to a second standby cycle time in the standby operating state by way of a predefined change parameter.

DE 102012205301 A1 discloses a computer architecture for controlling electronic data processing in a vehicle, comprising: a computer apparatus for executing the electronic data processing, at least two virtual machines, wherein a first virtual machine comprises a first operating system and a second virtual machine comprises a second operating system, a virtualization layer that is designed such that the first and second operating systems are able to be operated in parallel on the computer apparatus, wherein the second operating system meets a higher safety specification than the first operating system.

SUMMARY OF THE INVENTION

One aspect of the invention is to specify a vehicle system, a vehicle, and a method that is improved in terms of the waiting time for operational readiness and safe operation.

One aspect of the invention is achieved by specifying a vehicle system comprising:
  a hardware level;
  a first operating system;
  a virtual machine having a second operating system, wherein the virtual machine is integrated on the hardware level; and
  a hypervisor that is designed to operate the virtual machine on the hardware level such that the first operating system and the second operating system are able to be operated in parallel on the hardware level,
  wherein at least one first application is able to be executed on the first operating system and at least one second application is able to be executed on the second operating system,
  wherein the at least one first application has a higher safety standard than the at least one second application, and
  wherein the second operating system is configured to be operated in suspend-to-RAM mode while the first operating system is switched off.

The hardware level is often also referred to as computer system or computer unit and preferably contains a processor, a working memory and an interface.

The hypervisor is in this case designed as an abstract layer between the hardware level on which the virtual machine is executed and the virtual machine. The implementation is achieved based purely on hardware, based purely on software, or by a combination of both. The hypervisor is in particular designed to provide and to manage virtual machines. The virtual machine preferably emulates the computer architecture of a computer that actually exists in hardware form or a hypothetical computer. The operating system of the virtual machine is often also referred to as a guest operating system. The hypervisor generally permits operation of a plurality of virtual machines simultaneously on a physical computer system. The hypervisor may also be referred to as virtualization layer.

The hypervisor may be designed as a type 0, type 1, or type 2 hypervisor, and for example provide further virtual machines in addition to the first virtual machine.

A type 1 hypervisor is integrated directly on the hardware level and does not require a fully fledged operating system. The virtual machines and their allocation of the resources, for example working memory, CPU, are supported dynamically by a minimal operating system or even no operating system. Examples of the type 1 hypervisor include Microsoft Hyper-V or the Citrix XenServer, or for embedded systems Sysgos PikeOS, Green Hills Integrity, or Freescales Topaz.

The hypervisor is configured such that the virtual machines are able to be executed simultaneously on the hardware level.

The type 2 hypervisor is integrated within a fully fledged main operating system that takes over the ultimate allocation of the resources that are requested by the virtual machine. The type 2 hypervisor controls the virtual machines from there. Known examples are VMware Workstation, VirtualBox, or Linux Kernel-based Virtual Machine (KVM).

A type 0 hypervisor is integrated directly on the hardware level without a supporting operating system.

Safety-relevant first functions or applications with a high safety standard are for example instrument cluster applications, monitoring, and control functions in the vehicle.

Non-critical second applications, that is to say applications with a lower safety standard, are for example infotainment system applications. Infotainment system applications in this case relate to functions of an infotainment system. An infotainment system comprises for example car radio or multimedia system, navigation system, and hands-free speech apparatus.

Such infotainment systems usually have a NAND storage unit that requires a complex startup procedure.

A division into applications with a high or low safety standard may be made for example using the ISO 26262 ("Road vehicles—Functional safety") ISO standard for safety-relevant electrical/electronic systems in motor vehicles.

It has been recognized according to one aspect of the invention that applying suspend-to-RAM mode to the entire vehicle system is dangerous because the probability of an unsuccessful boot or an undefined boot is very high. The permanently switched-on state of the hardware on the hardware level, for example the memory, and of the operating systems ensures that memory leaks and memory fragmentation do not influence the behavior of the vehicle system in a deterministic manner.

Instead of putting the entire vehicle system into suspend-to-RAM mode, the system is partitioned such that the second operating system is configured to be operated in suspend-to-RAM mode while the first operating system is switched off. At least one first application is able to be executed on the first operating system and at least one second application is able to be executed on the second operating system. The at least one first application has a higher safety standard than the at least one second application.

Thus, only the non-critical part of the system is put into suspend-to-RAM mode. The critical part of the system is rebooted, thereby ensuring a safe startup and safe operation.

Robustness and fast availability of the operating system on which the safety-critical applications run is thereby above all ensured, whereas the non-safety-critical operating system containing the non-critical applications is available quickly through suspend-to-RAM mode. Fast availability of the vehicle system, on the one hand, and safe operation of the vehicle system, on the other hand, are thereby ensured.

The power consumption of the vehicle system is minimized.

The first operating system preferably has a higher safety standard than the second operating system. The first operating system may therefore be designed as a certifiable, real-time capable fast-booting first operating system for safety-critical functions/applications. The first operating system may be designed for example as an AUTOSAR (AUTomotive Open System ARchitecture) operating system. AUTOSAR is in this case a software architecture for electronic controllers. The first operating system may furthermore be designed for example as PikeOS. This is a real-time operating system that offers a hypervisor based on a separation kernel and having several partition types for many other operating systems. The PikeOS real-time operating system was designed for safety-critical applications with certification requirements. A further example of such an operating system is QNX, which constitutes a proprietary POSIX-capable unix-like real-time operating system.

The second operating system for non-critical functions/applications is for example designed as a high-level OS (operating system). The second operating system may be for example a Linux, Genivi, Windows, or Android operating system.

When the vehicle system is put into operation, it is preferably possible to reboot the first operating system and to start up the second operating system from suspend-to-RAM mode.

The vehicle system preferably comprises the at least one first application and the at least one second application, wherein the at least one first application is switched off while the at least one second application is in suspend-to-RAM mode.

When the vehicle system is put into operation, it is thus preferably possible to reboot the at least one first application and to start up the at least one second application from suspend-to-RAM mode. It is thereby possible to safely execute the safety-critical first application/applications and to quickly execute the non-critical second application/applications.

In one preferred refinement, the hypervisor is configured to be switched off when the vehicle system is taken out of operation and to be rebooted when the vehicle system is put into operation. Safe operation of the hypervisor is thereby able to be ensured.

The hardware level is preferably designed as a system-on-chip (SoC). The system-on-chip preferably comprises at least a microprocessor, a working memory, an interface, and a bus. A system-on-chip is essentially understood to mean integrating all or the majority of the functions of a programmable electronic system on a chip, that is to say an integrated circuit on a semiconductor substrate, also called monolithic integration.

The hardware level preferably has resources, wherein the hypervisor is configured to divide the resources between the first operating system and second operating system such that the first operating system and second operating system are able to be operated independently of one another. The hypervisor is preferably configured to partition at least one of the resources by virtue of the hypervisor allocating a first section of the at least one resource to the first operating system and a second section of the at least one resource to the second operating system. The hypervisor is furthermore preferably configured to provide the at least one first application and the at least one second application in a first and second operating system partition on the hardware level. As a result, both operating systems are able to be operated on the same hardware. The safety-critical and non-critical applications are thus able to use the same hardware.

The vehicle system preferably comprises a first virtual machine having the first operating system and a second virtual machine having the second operating system. The first virtual machine and the second virtual machine are integrated on the hardware level such that the first virtual machine and the second virtual machine are able to be operated in parallel on the hardware level. The at least one first application is able to be executed on the first operating system and the at least one second application is able to be executed on the second operating system. The at least one first application has a higher safety standard than the at least one second application. A hypervisor that is designed to operate the first virtual machine and the second virtual machine on the hardware level, wherein the second virtual machine is designed to be operated in suspend-to-RAM mode while the first virtual machine is switched off.

A type 1 or type 0 hypervisor is primarily used in this case. Efficient use of multicore processors is thus possible. The multicore cores may be assigned to the various virtual machines.

The hardware level preferably comprises at least one resource, wherein the hypervisor is configured to partition at least one of the resources by virtue of the hypervisor allocating a first section of the at least one resource to the first virtual machine and a second section of the at least one resource to the second virtual machine. Both virtual machines are thereby able to be operated in parallel with one another more easily.

In a further preferred refinement, when the vehicle system is put into operation, it is possible to reboot the first operating system of the first virtual machine and to start up the second operating system of the second virtual machine from suspend-to-RAM mode.

One aspect of the invention is achieved by specifying a vehicle that has a vehicle system as described above. In one preferred refinement, the vehicle system has at least one component, wherein the vehicle system has an interface for the vehicle system to communicate with the at least one component. This component may be for example an infotainment system or a driver's camera.

The object is furthermore achieved by specifying a method for operating a vehicle system comprising the steps of:
providing a first operating system on a hardware level;
providing a hypervisor on the hardware level;
wherein the hypervisor providing a virtual machine having a second operating system, such that the first operating system and the second operating system are able to be operated in parallel on the hardware level, wherein at least one first application is able to be executed on the first operating system and at least one second application is able to be executed on the second operating system, wherein the at least one first application has a higher safety standard than the at least one second application; and
operating the second operating system in suspend-to-RAM mode while the first operating system is switched off.

The advantages of the vehicle system may also be transferred to the method.

The method preferably comprises the steps of:
providing a hypervisor on the hardware level;
wherein the hypervisor provides a first virtual machine having the first operating system;
wherein the hypervisor provides a second virtual machine having the second operating system, such that the first virtual machine and the second virtual machine are able to be operated in parallel on the hardware level, wherein the at least one first application is able to be executed on the first operating system and the at least one second application is able to be executed on the second operating system, wherein the at least one first application has a higher safety standard than the at least one second application; and
operating the second virtual machine in suspend-to-RAM mode while the first virtual machine is switched off.

The method preferably comprises the further steps of:
providing an operative vehicle system;
putting the second operating system into suspend-to-RAM mode and;
shutting down the first operating system.

The method preferably comprises the further steps of:
providing an operative vehicle system;
putting the second operating system into suspend-to-RAM mode and shutting down the first operating system; and
shutting down and switching off the hypervisor.

In a further preferred refinement, the method comprises the further steps of:
providing the first operating system in the switched-off state;
providing the second operating system in suspend-to-RAM mode;
booting the first operating system by way of a reboot when the vehicle system is put into operation; and
booting the second operating system from suspend-to-RAM mode when the vehicle system is put into operation.

In a further preferred refinement, the method comprises the further steps of:
providing an operative vehicle system; and
shutting down the at least one first application and putting the at least one second application into suspend-to-RAM mode.

At least one resource of the hardware level is preferably partitioned by the hypervisor allocating a first section of the at least one resource to the first operating system and a second section of the at least one resource to the second operating system.

The method is preferably designed so as to be performed on a vehicle system as described above.

One aspect of the invention is achieved by specifying a computer program comprising commands that cause the vehicle system as described above to execute the method steps as described above. The method may thus also be retroactively installed more easily in vehicles suitable for this purpose.

BRIEF DESCRIPTION OF THE DRAWINGS

Further features, properties and advantages of the present invention emerge from the following description with reference to the attached figures, in which, schematically.

DETAILED DESCRIPTION OF THE
PRESENTLY PREFERRED EMBODIMENTS

Although the invention has been described and illustrated in more detail through the preferred exemplary embodiments, the invention is not limited by the disclosed examples. Variations thereof may be derived by a person skilled in the art without departing from the scope of protection of the invention as is defined by the following patent claims.

Figure 1:
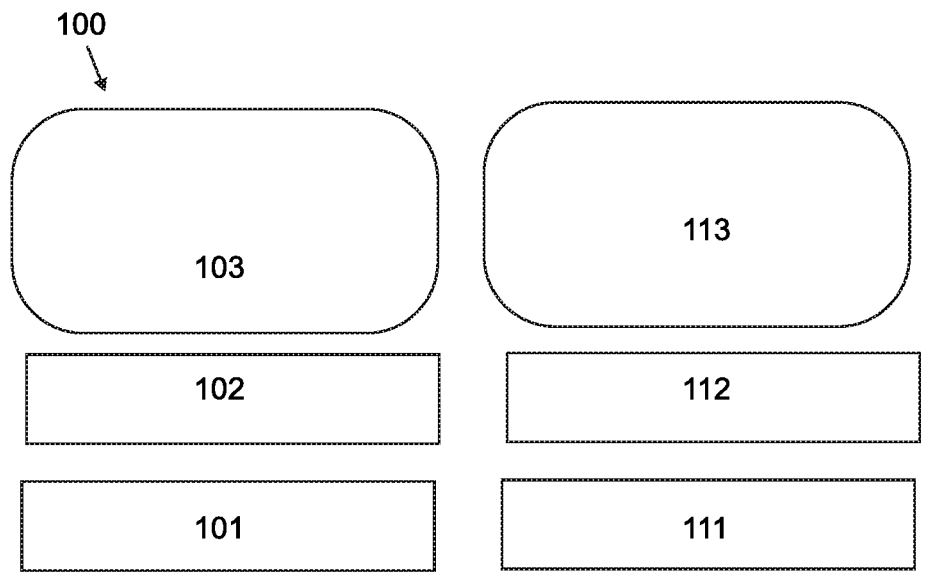
FIG. 1: is a first vehicle system according to the prior art.

FIG. 1 shows a vehicle system 100 according to the prior art. The vehicle system 100, which is used in a vehicle, comprises a first hardware level 101 that has a first operating system 102. The first operating system 102 is designed for first safety-critical functions/applications 103, that is to say for applications with a high safety standard in the vehicle.

The vehicle system 100 furthermore comprises a second hardware level 111 having a second operating system 112. The second operating system 112 is designed for second non-critical functions/applications 113, that is to say for applications with a low safety standard in the vehicle.

Each of the hardware levels 101, 111 in this case preferably comprises at least a microprocessor, a BIOS, a working memory (RAM), and/or a flash memory, a clock generator and various interfaces and a plurality of buses.

The hardware levels 101, 111 may furthermore have a startup memory unit or a boot ROM memory, for example in the form of a flash or OTP memory, in which program elements responsible for the startup procedure are stored.

The hardware levels 101, 111 are physically separate from one another; they are for example on different integrated circuits.

In this case, the first operating system 102 is designed for safety-critical functions or safety-critical applications 103 and the second operating system 112 is designed for non-critical functions or non-critical applications 113.

The second hardware level 111 has a high-level OS (operating system) as a second operating system 112 for non-critical functions/applications 113. The second operating system 112 may be for example Linux, Genivi, Windows, or Android. Non-critical functions are performed for example by the vehicle infotainment system. The vehicle infotainment system may in this case have functions for car radio or multimedia systems, navigation system, and/or hands-free speech apparatus.

Such vehicle infotainment systems usually have a NAND storage unit that requires a complex startup procedure.

The first hardware level 101 has, as first operating system 102, a certifiable real-time capable fast-booting first operating system 102 for safety-critical functions/applications 103.

The operating systems 102, 112 and their applications 103, 113 are thus executed independently of one another, that is to say the operating systems 102, 112 are operated and taken out of operation independently of one another.

The vehicle system 100 is started up as follows:

The entire vehicle system 100, that is to say both operating systems 102, 112, is rebooted and initialized. The startup performance is optimized for all independent operating systems 102, 112.

Figure 2:
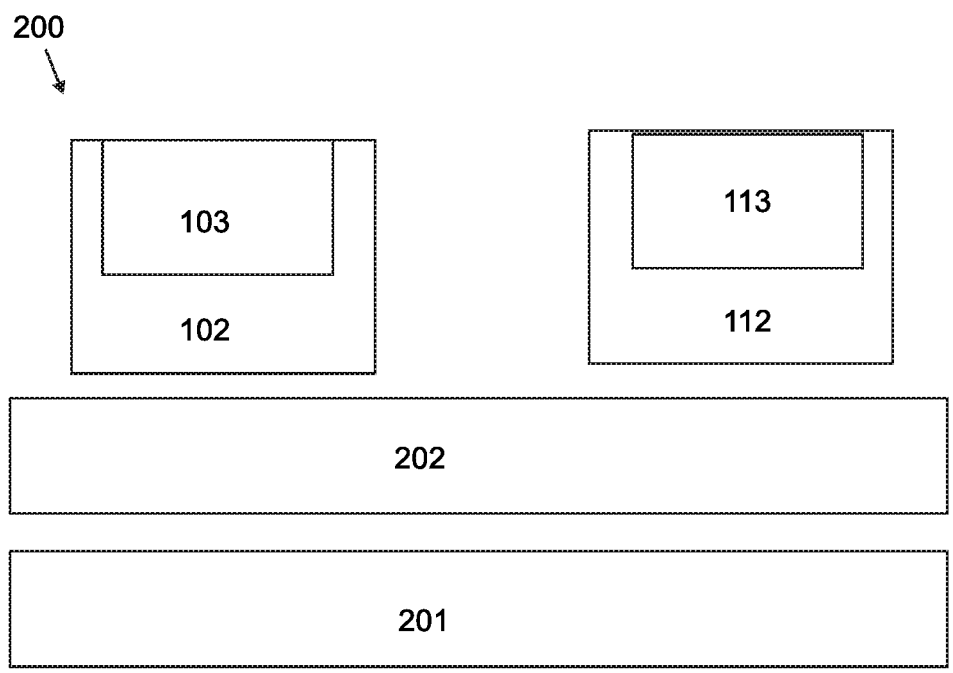
FIG. 2: is a second vehicle system according to the prior art.

FIG. 2 shows a further example of a vehicle system 200 according to the prior art. The vehicle system 200 has a hardware level 201 having a hypervisor (virtualization layer) 202 located thereon and that installs at least two virtual machines on the hardware level 201. In this case, the first virtual machine comprises the first operating system 102 for the safety-critical first applications 103. The first operating system 102 may, as described above, be designed as a certifiable, real-time capable fast-booting first operating system 102. The first operating system 102 may for example be AUTOSAR (AUTomotive Open System ARchitecture). AUTOSAR is in this case a software architecture for electronic controllers. As an alternative, the first operating system 102 may be designed as PikeOS. This is a real-time operating system. The PikeOS real-time operating system was created for safety-critical first applications 103 with certification requirements. The first virtual machine may furthermore comprise an input/output driver and a real-time scheduler. The safety-critical first applications 103 are furthermore able to be executed on the first virtual machine. These may be for example instrument cluster applications with relatively high safety standards.

The second virtual machine has the second operating system 112, such as for example a high-level OS (operating system), in particular such as for example Linux, Genivi, Windows, or Android, for the non-critical second applications 113. The second virtual machine may furthermore likewise comprise an input/output driver and a scheduler. Non-critical second applications 113 may for example be infotainment applications with low safety standards. The virtual machines and thus the two operating systems 102, 112 may be decoupled both from one another and from the hardware level 201 of the vehicle system 200 by the hypervisor 202. A type 1 or type 0 hypervisor is used for this purpose.

When the vehicle is switched off, the entire vehicle system 200 is put into suspend-to-RAM mode (STR) in the RAM (data memory). This suspend-to-RAM mode is also called standby mode (sleep mode). Fast availability of the vehicle system 200 is thereby achieved.

Figure 3:
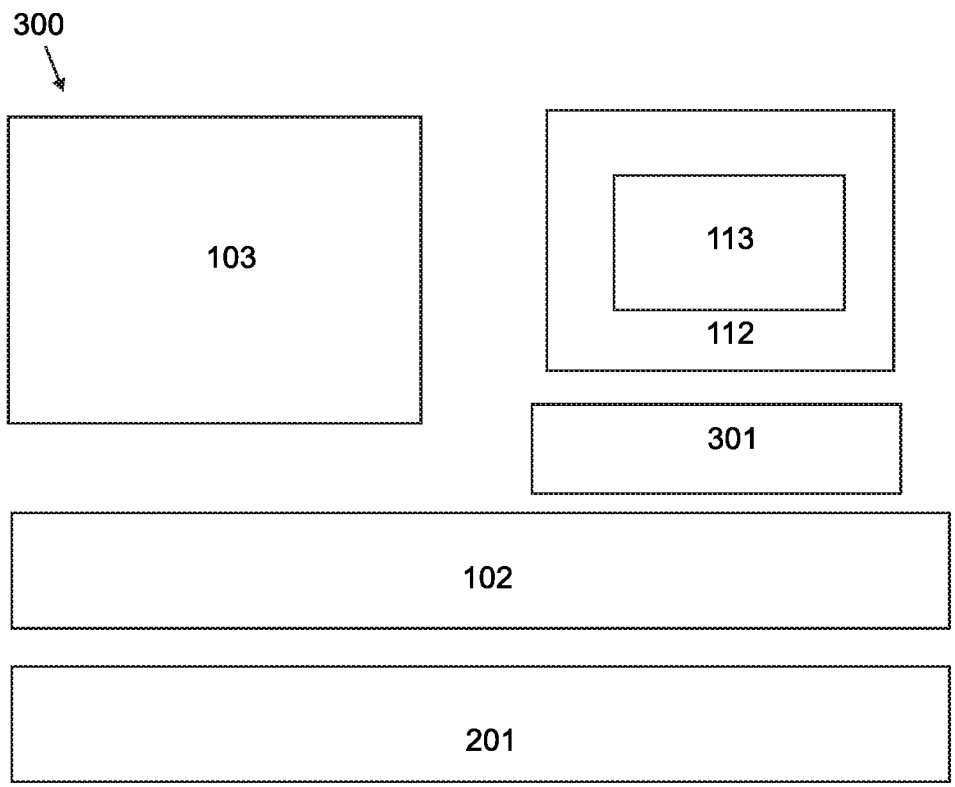
FIG. 3: is a third vehicle system according to the prior art.

FIG. 3 shows a further vehicle system 300 according to the prior art. In this case, a hardware level 201 onto which the first operating system 102 for the first safety-critical applications 103 is directly integrated is provided. The first operating system 102 may, as described above, be designed as a certifiable, real-time capable, fast-booting first operating system 102.

The vehicle system 300 contains a hypervisor 301 that is configured such that a virtual machine, installed on the hardware level 201 by the hypervisor 301 and that has the second operating system 112 for second non-critical applications 113, is able to be executed simultaneously on the hardware level 201. The first operating system 102 may in this case create the virtual machine on which the second operating system 113 is hosted. The first operating system 102 may create such a virtual machine for example using an API (application programming interface), for example the hypercall API. A type 2 hypervisor is used for this purpose. Such a type 2 hypervisor is integrated within a fully fledged main operating system that takes over the ultimate allocation of the resources, such as for example the CPU, that are requested by the virtual machine. The hypervisor controls the virtual machine from there. Known examples are VMware Workstation, VirtualBox, or Linux Kernel-based Virtual Machine (KVM).

The vehicle systems 200, 300 according to the prior art therefore run on the same hardware level 201 with a single memory. The applications are however executed in different operating systems: critical first applications 103 on an ASIL (Automotive Safety Integrity Level)-certified operating system (OS), in this case the first operating system 102, and non-critical second applications 113 on a high-level operating system (OS), in this case the second operating system 112, such as for example Android/Linux/Windows, the separation being ensured by the hypervisor 202, 301.

When the vehicle is switched off, the entire vehicle system 200, 300 is put into suspend-to-RAM mode (STR) in the RAM (data memory).

Figure 4:
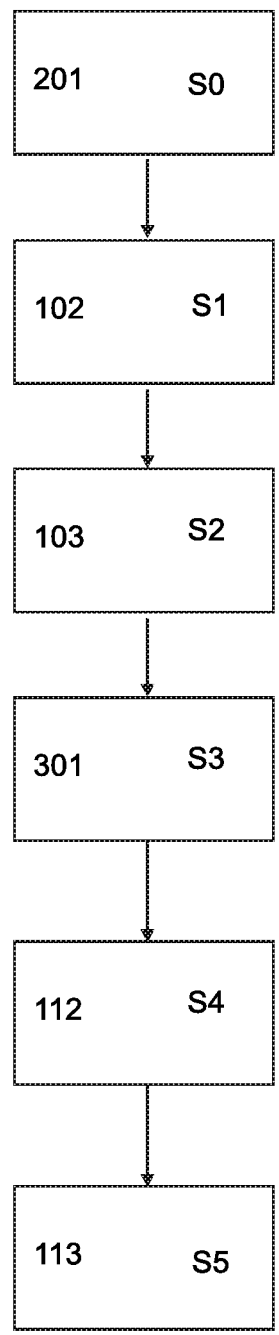
FIG. 4: is a startup method according to the prior art.

FIG. 4 shows a method for starting up the vehicle system 300 according to the prior art.

All of the operating systems 102, 112 and applications 103, 113 and the hypervisor are fetched from suspend-to-RAM mode in the RAM.

In a first step S1, the first operating system 102 is booted on the hardware 201, which was provided in a step S0, from the RAM, where it waits in a suspend-to-RAM mode. The first operating system 102 may for example be designed as AUTOSAR (AUTomotive Open System ARchitecture), PikeOS, or QNX Integrity.

In a second step S2, the safety-critical applications 103, which are stored in the RAM in a suspend-to-RAM mode, are booted on the first operating system 102. Applications with a high safety standard/safety requirements are for example instrument cluster applications. These are preferably associated with a combined instrument.

In a third step S3, the hypervisor 301, which is stored in the RAM in a suspend-to-RAM mode, is booted. This installs a virtual machine on the hardware level 201. The hypervisor 301 is preferably designed here as a type 2 hypervisor that is integrated within the first operating system 102. It takes over the allocation of the resources, such as CPU, etc., of the hardware level 201. The hypervisor 301 therefore allocates the resources for the virtual machine. It distributes the resources such that all of the resources are available for the second operating system 112 when required, as though only one operating system were present.

Next, in a fourth step S4, the second operating system 112, a high-level operating system such as Linux, Windows, Android, operated in the virtual machine, is booted on the hardware level 201 by the hypervisor 301. The second operating system 112 is booted from the RAM, where it is stored in a suspend-to-RAM mode.

The hypervisor 301 is designed such that the first operating system 103 and the second operating system 112 are decoupled from one another and are executed in parallel with one another. Non-critical second applications 113 are able to be integrated in a separate operating system partition on the hardware level 201 by the hypervisor 301.

In a fifth step S5, the non-critical second applications 113, which are stored in the RAM in a suspend-to-RAM mode, are booted. These may for example belong to the infotainment applications.

The entire vehicle system 300 is therefore booted at startup from the system-wide RAM, where it is stored in a suspend-to-RAM mode.

It has however been recognized that applying suspend-to-RAM mode to safety-critical applications 103 and the associated operating system 102 is dangerous because the probability of an unsuccessful boot or an undefined boot is very high. A permanently switched-on vehicle system 300, for example the permanently switched-on memory, ensures that memory leaks and memory fragmentation are not able to influence the behavior of the vehicle system 300 in a deterministic manner Applying suspend-to-RAM mode to the entire vehicle system 300 jeopardizes the reliability of the critical first applications 103 and non-critical second applications 113.

There is the risk of the RAM content having a defect following the wake-up, that is to say for example by booting the vehicle and the vehicle system 200, 300, as a result of which the entire vehicle system 300 may crash. The problems with memory leaks and memory fragmentation furthermore build up from startup to startup.

The same applies for the vehicle system 200 according to the prior art.

Figure 5:
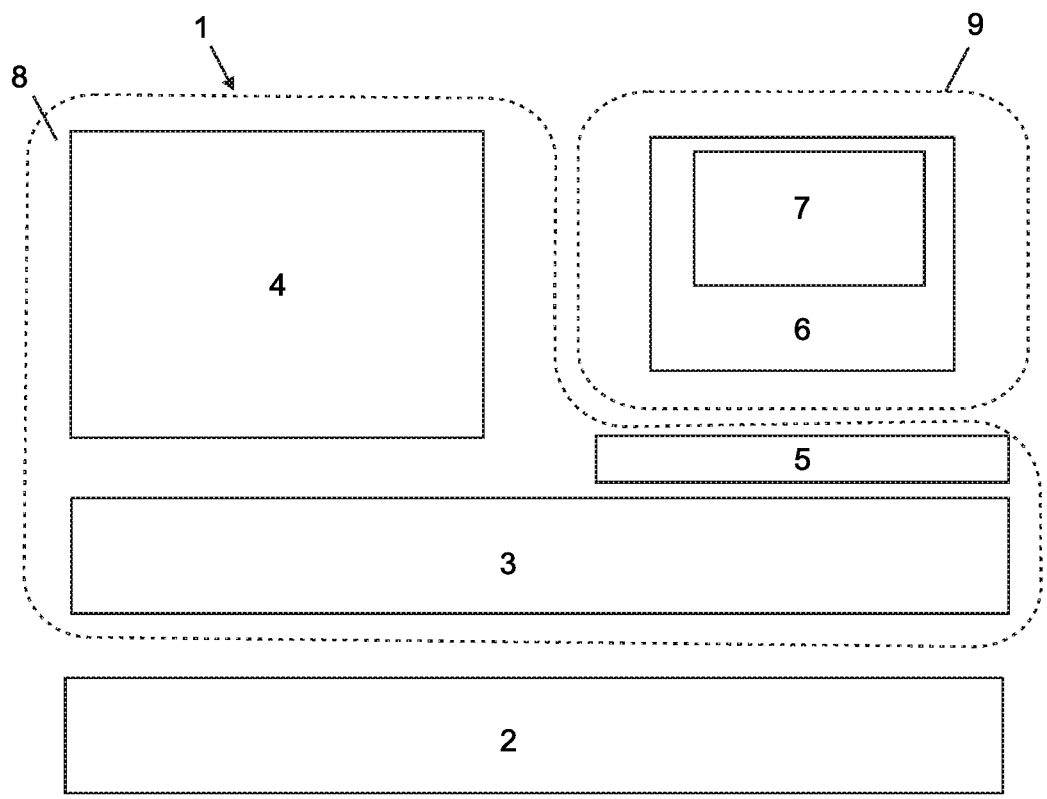
FIG. 5: is a first vehicle system.

FIG. 5 shows a vehicle system 1 according to one aspect of the invention. The vehicle system 1 comprises a hardware level 2 that preferably comprises at least a microprocessor, a working memory (RAM, main memory) and a flash memory, a clock generator, various interfaces, and a plurality of buses. The hardware level 2 furthermore comprises a first operating system 3. The first operating system 3 is preferably designed as a certifiable, real-time capable fast-booting Automotive Safety Integrity Level (ASIL) first operating system 3. The first operating system 3 is preferably selected with regard to the ISO standard ("Road vehicles—Functional safety") for safety-relevant electrical/electronic applications in motor vehicles. Safety-critical first applications 4 are preferably executed on the first operating system 3. These are preferably designed as instrument cluster applications and are preferably associated with a combined instrument.

The vehicle system 1 furthermore comprises a hypervisor 5 that installs a virtual machine. The hypervisor 5 is preferably designed as a type 2 hypervisor. Such a type 2 hypervisor is integrated within a fully fledged main operating system that takes over the ultimate allocation of the resources, such as for example CPU, etc., that are requested by the virtual machine. The hypervisor 5 controls the virtual machine from there. Known examples are VMware Workstation, VirtualBox or Linux Kernel-based Virtual Machine (KVM).

The hypervisor 5 installs the virtual machine having a second operating system 6 on the hardware level 2. In this case, first applications 4 are executed on the first operating system 3 and second applications 7 are executed on the second operating system 6, wherein the first, safety-critical applications 4 have a higher safety standard than the second, non-critical applications 7. The second, non-critical applications 7 may in this case be assigned to a vehicle infotainment system. This means that both the first, safety-relevant applications 4 and the non-critical second applications 7 are executed on a hardware level 2 with a common memory.

The hardware level 2 is preferably designed as a system-on-chip (SoC) having a multicore processor, that is to say a high-performance multicore system.

In this case, the second operating system 6 is designed to be operated in suspend-to-RAM mode while the first operating system 3 is switched off.

Instead of putting the entire vehicle system 1 into suspend-to-RAM mode, the vehicle system 1 is partitioned by way of the hypervisor 5 such that only a second part 9 of the vehicle system 1 that comprises the second operating system 6 containing the non-critical applications 7 is put into suspend-to-RAM mode. A first part 8 of the vehicle system 1 that comprises the first operating system 3 containing the first safety-relevant applications 4 and the hypervisor 5 is rebooted.

A safe and fast startup of the entire vehicle system 1 according to one aspect of the invention is thus possible.

The robustness of the first, safety-relevant applications 4 and fast availability of the second applications 7 is thus ensured. The second applications 7 of the second operating system 6, such as for example the infotainment functions, are non-critical. All of the operating systems, that is to say the first operating system 3 and the second operating system 6, with their applications 4, 7, are available quickly in the vehicle system 1 according to the invention.

Figure 6:
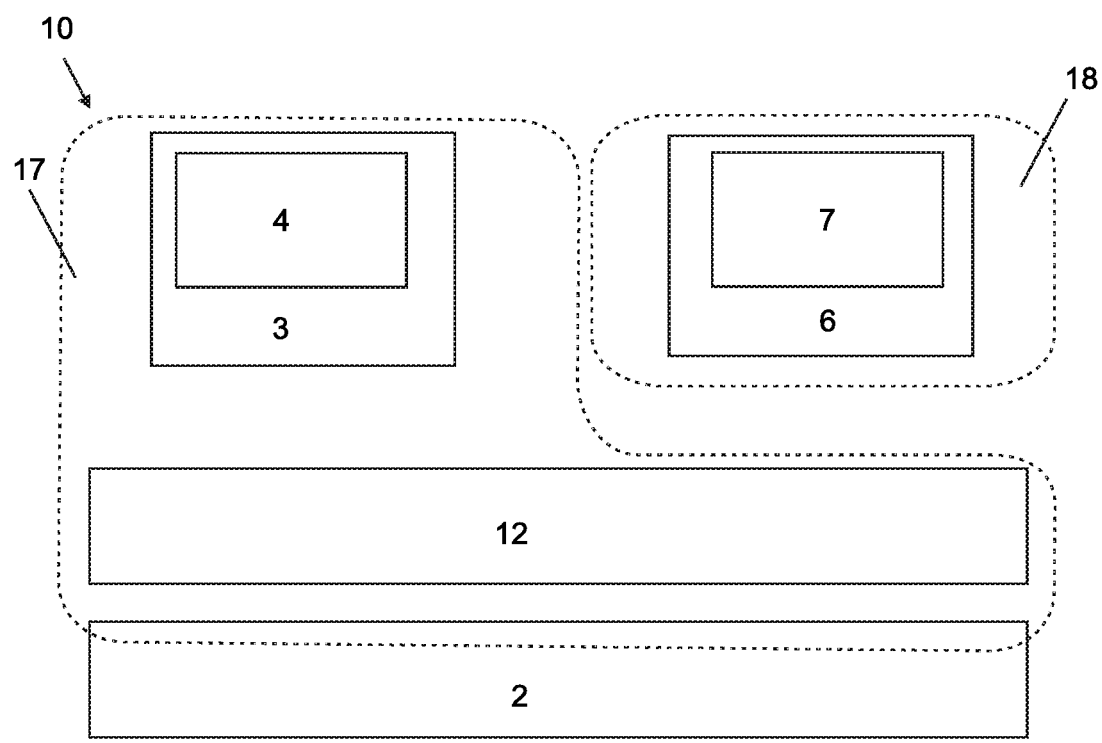
FIG. 6: is a second vehicle system.

FIG. 6 shows a further vehicle system 10 according to the invention. This likewise comprises the hardware level 2. A hypervisor 12 is furthermore located on the hardware level 2. The hypervisor 12 is designed as a type 1 or type 0 hypervisor. A type 1 hypervisor is integrated directly on the hardware and does not require a fully fledged or even any operating system. Virtual machines and their allocation of the resources (for example working memory) are supported dynamically by a minimal operating system or even no operating system. Examples include Microsoft Hyper-V or the Citrix XenServer, or for embedded systems Sysgos PikeOS, Green Hills Integrity, Freescales Topaz.

The hypervisor 12 installs a first virtual machine having the first operating system 3. The first operating system 3 may be designed, as described above, as a certifiable, real-time capable fast-booting Automotive Safety Integrity Level (ASIL) first operating system 3. First, safety-critical applications 4 are executed on the first operating system 3.

The hypervisor 12 installs a second virtual machine having the second operating system 6. Second, non-critical applications 7 are executed thereon.

Instead of putting the entire vehicle system 10 into suspend-to-RAM mode, the vehicle system 10 is partitioned by the hypervisor 12 such that only a second part 18 of the vehicle system 10 that comprises the second virtual machine is put into suspend-to-RAM mode. A first part 17 of the vehicle system 10 that comprises the first operating system 3 containing the safety-relevant applications 7 and the hypervisor 12 is rebooted.

Figure 7:
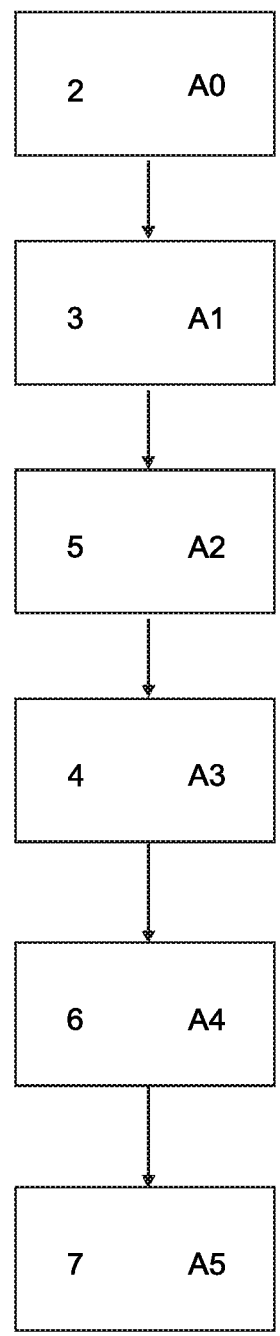
FIG. 7: is a startup method.

FIG. 7 shows a startup procedure according to one aspect of the invention for the vehicle system 1 according to the invention (FIG. 5). The hardware level 2 (FIG. 5) is provided here in a step A0.

The first part 8 (FIG. 5) of the vehicle system 1 (FIG. 5) is first of all rebooted through what is known as a cold boot. In the cold boot, a vehicle system is booted from a switched-off state and put into the normal operating state.

To this end, the first operating system 3 (FIG. 5) is first of all rebooted in a step A1.

In a step A2, the hypervisor 5 (FIG. 5) is then rebooted, said hypervisor setting up a virtual machine on the hardware level 2 (FIG. 5).

In a step A3, the safety-critical applications 4 (FIG. 5) are then rebooted.

The second part 9 of the vehicle system 1 (FIG. 5) is then booted through what is known as a warm boot. In this case, the functions/applications are fetched from suspend-to-RAM mode.

In a step A4, the second operating system 6 is for this purpose first of all fetched from suspend-to-RAM mode.

In a further step A5, the non-critical applications 7 are then booted and executed on the second operating system 6.

The invention is applicable to all fields in which safety-relevant and non-safety-relevant applications are executed in a hypervisor environment.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vehicle system comprising:
   a hardware level;
   a first operating system;
   a second operating system that is different than the first operating system;
   a virtual machine integrated on the hardware level having the second operating system; and
   a hypervisor configured to operate the virtual machine on the hardware level such that the first operating system and the second operating system are able to be operated in parallel on the hardware level;
   wherein at least one first application is able to be executed on the first operating system and at least one second application is able to be executed on the second operating system;
   wherein the at least one first application has a higher safety standard than the at least one second application; and
   wherein the second operating system is configured to be in suspend-to-RAM mode while the first operating system is switched off, and
   wherein the second operating system is configured to be fetched from suspend-to-RAM mode after the first operating system is rebooted.

2. The vehicle system as claimed in claim 1,
   wherein, when the vehicle system is put into operation:
   the first operating system is rebooted and
   the second operating system is started from the suspend-to-RAM mode.

3. The vehicle system as claimed in claim 1,
   wherein the at least one first application is switched off while the at least one second application is in the suspend-to-RAM mode.

4. The vehicle system as claimed in claim 3, wherein, when the vehicle system is put into operation:
   the at least one first application is rebooted and
   the at least one second application is started from the suspend-to-RAM mode.

5. The vehicle system as claimed in claim 1,
   wherein the hypervisor is configured to be switched off when the vehicle system is taken out of operation and is configured to be rebooted when the vehicle system is put into operation.

6. The vehicle system as claimed in claim 1,
   wherein the first operating system has a higher safety standard than the second operating system.

7. The vehicle system as claimed in claim 1,
   wherein the hardware level is designed as a system-on-chip.

8. The vehicle system as claimed in claim 1,
wherein the hardware level has resources,
wherein the hypervisor is configured to divide the resources between the first operating system and second operating system such that the first operating system and second operating system are able to be operated independently of one another.

9. The vehicle system as claimed in claim 8,
wherein the hypervisor is configured to partition at least one of the resources by virtue of the hypervisor allocating a first section of the at least one of the resources to the first operating system and a second section of the at least one of the resources to the second operating system.

10. The vehicle system as claimed in claim 1, wherein the hypervisor is configured to provide the at least one first application and the at least one second application in a first operating system partition and a second operating system partition on the hardware level.

11. The vehicle system as claimed in claim 1, further comprising:
a first virtual machine having the first operating system;
wherein the first virtual machine is integrated on the hardware level such that the first virtual machine and the virtual machine are able to be operated in parallel on the hardware level,
wherein the hypervisor is configured to operate the virtual machine and the first virtual machine on the hardware level,
wherein the virtual machine is designed to be in suspend-to-RAM mode while the first virtual machine is switched off.

12. The vehicle system as claimed in claim 11,
wherein the hardware level comprises at least one resource,
wherein the hypervisor is configured to partition at least one of the at least one resource by the hypervisor allocating a first section of the at least one resource to the first virtual machine and a second section of the at least one resource to the virtual machine.

13. The vehicle system as claimed in claim 11,
wherein, when the vehicle system is put into operation, the first operating system of the first virtual machine is rebooted and the second operating system of the virtual machine is started from the suspend-to-RAM mode.

14. A vehicle having a vehicle system comprising:
a hardware level;
a first operating system;
a second operating system that is different than the first operating system;
a virtual machine integrated on the hardware level having the second operating system; and
a hypervisor configured to operate the virtual machine on the hardware level such that the first operating system and the second operating system are able to be operated in parallel on the hardware level;
wherein at least one first application is able to be executed on the first operating system and at least one second application is able to be executed on the second operating system;
wherein the at least one first application has a higher safety standard than the at least one second application; and
wherein the second operating system is configured to be in suspend-to-RAM mode while the first operating system is switched off, and
wherein the second operating system is configured to be fetched from suspend-to-RAM mode after the first operating system is rebooted.

15. The vehicle as claimed in claim 14, wherein the vehicle system has at least one component, wherein the vehicle system has an interface for the vehicle system to communicate with the at least one component.

16. A method for operating a vehicle system, comprising:
providing a first operating system on a hardware level;
providing a hypervisor on the hardware level;
providing, by the hypervisor, a virtual machine having a second operating system that is different than the first operating system, wherein the first operating system and the second operating system are operable in parallel on the hardware level,
wherein at least one first application is able to be executed on the first operating system and at least one second application is able to be executed on the second operating system, wherein the at least one first application has a higher safety standard than the at least one second application; and
placing the second operating system in suspend-to-RAM mode while the first operating system is switched off, and
fetching the second operating system is configured from suspend-to-RAM mode after the first operating system is rebooted.

17. The method as claimed in claim 16, further comprising:
providing, by the hypervisor, a first virtual machine having the first operating system;
wherein the first virtual machine and the virtual machine are able to be operated in parallel on the hardware level; and
placing the virtual machine in suspend-to-RAM mode while the first virtual machine is switched off.

18. The method as claimed in claim 16, further comprising:
providing an operative vehicle system; and
putting the second operating system into suspend-to-RAM mode; and
shutting down the first operating system.

19. The method as claimed in claim 18, further comprising:
providing the first operating system in a switched-off state;
providing the second operating system in the suspend-to-RAM mode booting the first operating system by way of a reboot when the vehicle system is put into operation; and
booting the second operating system from the suspend-to-RAM mode when the vehicle system is put into operation.

20. The method as claimed in claim 16, further comprising:
providing an operative vehicle system;
putting the at least one second application into the suspend-to-RAM mode; and
shutting down the at least one first application.

21. A computer program stored on a nontransient memory comprising commands that when executed on a vehicle system cause the vehicle system to:
provide a first operating system on a hardware level;
provide a hypervisor on the hardware level;
provide, by the hypervisor, a virtual machine having a second operating system that is different than the first operating system, wherein the first operating system and the second operating system are operable in parallel on the hardware level, wherein at least one first application is able to be executed on the first operating system and at least one second application is able to be executed on the second operating system, wherein the at least one first application has a higher safety standard than the at least one second application; and place the second operating system in suspend-to-RAM mode while the first operating system is switched off, and fetch the second operating system is configured from suspend-to-RAM mode after the first operating system is rebooted.

* * * * *